United States Patent [19]

Casciani et al.

[11] 4,213,955

[45] Jul. 22, 1980

[54] COMPUTERIZED PROCESS AND APPARATUS FOR USE WITH A SUBMERGED ARC ELECTRIC FURNACE TO PRODUCE METALLURGICAL PRODUCTS

[75] Inventors: Ralph A. Casciani, Tonawanda; Wilmer L. Wilbern, Niagara Falls; William E. Mangan, Bronxville, all of N.Y.; Paul D. Franson, St. Albans, W. Va.

[73] Assignee: Union Carbide Corporation, New York, N.Y.

[21] Appl. No.: 854,257

[22] Filed: Nov. 23, 1977

Related U.S. Application Data

[63] Continuation of Ser. No. 712,275, Aug. 6, 1976, abandoned, which is a continuation of Ser. No. 363,581, May 24, 1973, abandoned, which is a continuation of Ser. No. 77,853, Oct. 5, 1970, abandoned.

[51] Int. Cl.² ............................................. C01B 31/32
[52] U.S. Cl. ............................... 423/442; 423/DIG. 5
[58] Field of Search ......... 423/441, 174, 442, DIG. 5; 13/12, 24, 139 ES, 33; 235/184; 432/51, 145

[56] References Cited

U.S. PATENT DOCUMENTS

| 360,144 | 3/1887 | Cowles et al. | 13/33 |
| 572,636 | 12/1896 | Hewes | 423/442 |
| 656,156 | 8/1900 | Horry | 423/442 |
| 874,944 | 12/1907 | Creelman | 423/441 |
| 2,422,734 | 6/1947 | Jung | 13/24 |
| 2,738,373 | 3/1956 | Alexander | 423/442 |
| 2,766,313 | 10/1956 | Reschke | 13/13 |
| 2,996,360 | 8/1951 | Kuhlmann | 423/441 |
| 3,010,796 | 11/1961 | Alexander et al. | 423/442 |
| 3,732,350 | 5/1973 | Hoyle et al. | 13/9 ES |
| 3,749,804 | 7/1973 | Thomas | 13/9 ES |

OTHER PUBLICATIONS

Wherry et al., Guide to Profitable Computor Control Process Instrumentation Manual, reprinted from Hydrocarbon Processing, Gulf Publishing Co., 1968.

Primary Examiner—O. R. Vertiz
Assistant Examiner—Gary P. Straub
Attorney, Agent, or Firm—John R. Doherty

[57] ABSTRACT

The invention relates to a computerized process and apparatus for automatically regulating the power, feed rate and electrode position of hollow or solid electrodes in submerged arc electric furnaces used for the production of quality-controlled metallurgical products such as calcium carbide.

1 Claim, 3 Drawing Figures

COMPUTERIZED PROCESS AND APPARATUS FOR USE WITH A SUBMERGED ARC ELECTRIC FURNACE TO PRODUCE METALLURGICAL PRODUCTS

This application is a continuation of our prior U.S. application Ser. No. 712,275 filed Aug. 6, 1976 which is a continuation of application Ser. No. 363,581 filed May 24, 1973 which is a continuation of application Ser. No. 077,853 filed Oct. 5, 1970 which is now all abandoned.

FIELD OF THE INVENTION

This invention relates to a process and apparatus for automatically monitoring and continuously regulating the power requirements and the feed rate of reactants to a submerged arc electric furnace utilizing hollow or solid electrodes for the production of high quality-controlled metallurgical products. Metallurgical products are intended to mean alloys, such as silicon metal-bearing alloys, and metal bearing compounds, such as calcium carbide. More specifically, the current regulation for any electrode of a single or poly-phase submerged arc electric furnace is continuously monitored and adjusted to coincide with the simultaneous monitoring and automatic regulation of the blend ratio of a reactant mixture fed into the reaction zone of the furnace, to automatically produce a quality-controlled metallurgical product, such reactant mixture being a lime and carboneous reducing agent when the product produced is calcium carbide.

DESCRIPTION OF THE PRIOR ART

The production of metallurgical products, such as calcium carbide, in a submerged arc electric furnace, have remained essentially the same since the electric arc furnace has been commercially used. However, the primary advancement or improvement made in the production of such products as calcium carbide, was in the concept of utilizing a hollow electrode in which a fine reactant feed can be fed through the hollow portion of the electrode directly into the reaction zone at the vicinity of the tip of the electrode. To best illustrate the use of hollow electrodes in the production of quality-controlled metallurgical products, the prior art production of calcium carbide will be discussed. A calcium carbide lime and carbonaceous reducing agent mixture is prepared and a substantial portion of the finely-divided particles measuring ¼ inch and finer are removed therefrom, e.g., about 90 percent of the finely-divided particles of lime and about 80 percent of the finely divided particles of carbonaceous reducing agent. The coarse lime and carbonaceous reducing agent mixture, measuring 3 inches by 2 inches and finer, to about a minimum size of ¼ inch in any one direction, is charged to an electric furnace around the hollow carbon heating electrode and electrical energy supplies the needed heat to convert the mixture to calcium carbide and carbon monoxide. Depending upon the amount of coarse reactants charged around the hollow carbon heating electrode, the ratio of the fine lime and carbonaceous reducing agent such as coke, coal or a mixture thereof can vary from 0 percent lime and 100 percent carbonaceous reducing agent to 0 percent carbonaceous reducing agent and 100 percent lime. The fine reactants are then fed into the reaction zone of the furnace through the hollow electrode. However, in order to produce the desired grade calcium carbide, it is necessary to maintain a correct over-all calcium carbide, forming proportion of lime and carbonaceous reducing agent in the furnace, that is, the total of the reactants around the hollow electrode plus the total of the reactants fed through the hollow electrode should be within the over-all calcium carbide forming proportions. The lime and carbonaceous reducing agent employed to produce calcium carbide and carbon monoxide can be present in substantially stoichiometric proportions, preferable however, about a 5 to 20 weight excess of lime over the stoichiometric proportion is desirable. The production and power efficiencies derived from the use of hollow electrodes in the production of calcium carbide is disclosed in U.S. Pat. No. 2,996,360. However since this hollow electrode innovation has been conceived, the overall calcium carbide process has remained relatively the same.

Operation of an electric arc furnace for the production of various metallurgical products, such as calcium carbide, is almost entirely dependent upon the experience of an operator and his ability to interpret instruments along with external happenings usually perceptible in and around an operating furnace. For example, an operator has to strive to maintain the current through each electrode in a poly-phase operating system at a maximum allowable value while simultaneously adjusting the vertical position of the electrode within the furnace so as to consistently produce a high quality yield of a metallurgical product, such as calcium carbide, at a low maintenance cost, i.e., low power usage per pound of product produced and minimum shut down periods for maintenance, electrode pounding and undercover cleanouts. A primary variable affecting current regulation and electrode position in the production of calcium carbide is the dependency of each upon the size and ratio of the carbonaceous reducing agent and lime mix. Thus when the resistance of the mix in the zone between the electrode tip and the lower surface of the furnace increases, thereby causing the electrode tip to rise too high in the furnace, the operator is then required to respond by cutting off the supply of mix to the electrode and substitute therefor a lime reactant feed. This will lower the resistance and allow the operator to lower the electrode. The reverse procedure is followed when the resistivity of the mix decreases so that only a carbonaceous reducing agent should be fed to the reaction zone.

The furnace operator is also responsible for slipping the electrode to compensate for consumption of the electrode during normal furnace operation. In addition, when incorporating water cooling means into the furnace system, the operator is required to observe a gas analyzer to accertain the hydrogen gas concentration of the off gas from the furnace because an abnormal increase in hydrogen is usually associated with a malfunctioning of the water cooling means whereupon a portion of the water finds its way into the furnace.

Combined with the above instrument readings and their interpretation, the operator of a calcium carbide producing furnace has to analyze the quality of the calcium carbide being produced and determine therefrom what corrective mix feed additions are to be made, if any. The quality of the carbide is determined by taking samples of the molten carbide from the furnace and then using gas analyzer means, such as an acetylene generator, to ascertain the cubic feet of acetylene gas producible per pound of carbide. This relationship between acetylene gas per pound of carbide is a standard way of expressing the calcium carbide quality.

Although an operator is responsible for interpreting the instruments listed above, and then required to manually react to maintain optimum power and feed conditions for producing a quality metallurgical product, such as calcium carbide, he is usually unable to completely compensate for the significant interactions between electrodes when the current passing through, or the position of, one electrode is altered.

The primary object of this invention is to provide a process and means for automatically and continually adjusting, among other things, the current, the vertical position and the rate and ratio blend of the reactants to be fed into an electric arc furnace so as to substantially maintain optimum process conditions during a production run for a quality-controlled metallurgical product, such as calcium carbide.

SUMMARY OF THE INVENTION

Broadly stated, the invention relates to a computerized process and apparatus for the automatic production of a metallurgical product, such as calcium carbide, using at least one electrode in a submerged arc electric furnace, preferably a prebaked or self-baking type hollow electrode comprised of carbon in the amorphous or graphite form. Electrode current regulation, electrode slipping, electrode length, electrode tip-to-hearth position and feed rate and ratio blend of a reactant mixture are the variables of an alloying process that are continually monitored and automatically compensated to provide optimum production conditions to produce a high yield quality metallurgical product at a substantially reduced production cost over the prior art.

Although this invention is directed to the production of various metallurgical products in a submerged arc electric furnace using at least one electrode, the discussion hereafter will be directed to an automatic calcium carbide process which will serve as an example to explain how the invention can be implemented with an electrical arc furnace, to produce a quality-controlled product.

A computerized calcium carbide process is implemented by programming a standardized computer, such as GE/PAC-4000 series (Trade mark registered to General Electric), to control an electric arc furnace preferably having at least one hollow electrode. The program and logic circuitry necessary for successful implementation of the process will be discussed hereinafter but first a brief outline of the major variables of the process will be given.

The electrode current regulation is accomplished primarily by raising or lowering an electrode in a submerged arc-furnace which increases or decreases, respectively, the impedance between the electrode tip and an electrically conductive element at the bottom of the furnace. However, in a polyphase operation, an additional impedance between the electrode tip and the conductive element results from the mix proportions being in common contact with all the phases in the furnace and thus this additional impedance must be considered when adjusting the electrode. This lowering and raising of the electrode, increases or decreases, respectively, the current flow through the electrode and thereby can effectively regulate the temperature at the reaction zone of the furnace to within some predetermined limits necessary for producing a quality calcium carbide product. The exact type of controllers necessary for positioning the electrodes within a furnace is usually dependent on the type of furnace being used and basically comprise a pair of contact elements coupled to an electrode hydraulic regulation cylinder or the like.

The periodic slipping of each electrode is required to compensate for consumption of the electrode during normal operating of the furnace. The rate of slippage required to maintain the tip-to-hearth distance relatively constant, or within a prescribed limit, is calculated from usage based on power consumed along with historical experience of the furnace and the calcium carbide process. The usage factor so calculated, is expressed in terms of megawatt hours per inch of electrode consumed. The numerical value of this usage factor depends on the reactant mix blend being fed into the furnace and when hollow electrodes are employed, this usage factor value is adjusted to compensate for the fine reactant mix which is fed directly into the reaction zone through the hollow electrode. In addition, long increment slipping has to be avoided so as to minimize the possible oxidation of the circumferential area of the electrode, between the cover of the furnace and the power contact plates affixed to the electrode and to prevent the slipping of an unbaked segment of the electrode when a self-baking type electrode is used.

The length of the electrode below the electrode contact plate has to be known at any given time since from this length dimension, the tip position can be calculated. The length of the electrode penetrating into the furnace is initially obtained by conventional sounding techniques and then this length is added to the slippage length during a specific time period to provide an overall sum from which the calculated usage can be subtracted to give the length of the electrode penetrating into the furnace at any particular time. This penetration length readily gives the tip position of the electrode within the furnace.

An alternate method for determining the tip position involves the use of thermocouples placed adjacent each electrode to measure the temperature of the ascending gas from the reaction zone. The increase or decrease in gas temperature as the electrode tip rises or lowers, respectively, in the mix burden can be calibrated, with a fair degree of accuracy, to correlate with electrode tip position above the hearth.

When using hollow electrodes in a poly-phase submerged arc furnace system, the fine mix reactants of a carbonaceous reducing agent, such as coke, coal, carbon, or a mixture thereof, and/or lime is controllably fed through each hollow electrode to maintain the quality of the calcium carbide product within some desired range. Simultaneously, a coarser type reactant mix is continually fed around each electrode in the furnace through cone inlet means by conventional techniques so as to provide a continuous carbide process. The temperature of the molten calcium carbide, precorrelated with the pure carbide contents of a tapped product, provides an effective means for immediately determining the calcium carbide quality. The quality of tapped calcium carbide is originally obtained by analyzing a sample of the tapped carbide product in an acetylene generator to ascertain the cubic feet of acetylene per pound of carbide. This acetylene to carbide ratio is the conventional way of expressing the quality of calcium carbide. Thus the correlation between tap temperature and carbide quality provided a means for immediately determining the quality of the carbide being produced and thereby enables the proportions of the fine feed reactants to be constantly adjusted so as to maintain the quality of the carbide within some predetermined range.

The above mentioned variables in addition to acting independently to provide a certain control or regulation for the calcium carbide process, must also act together with some being dominant and overriding the others. The programming of a conventional type analog or digital computer according to this invention, provides a novel means for substantially maintaining optimum overall conditions in an electric-arc furnace for the production of a quality-controlled calcium carbide product at a low maintenance cost.

DRAWINGS

Figure 1:
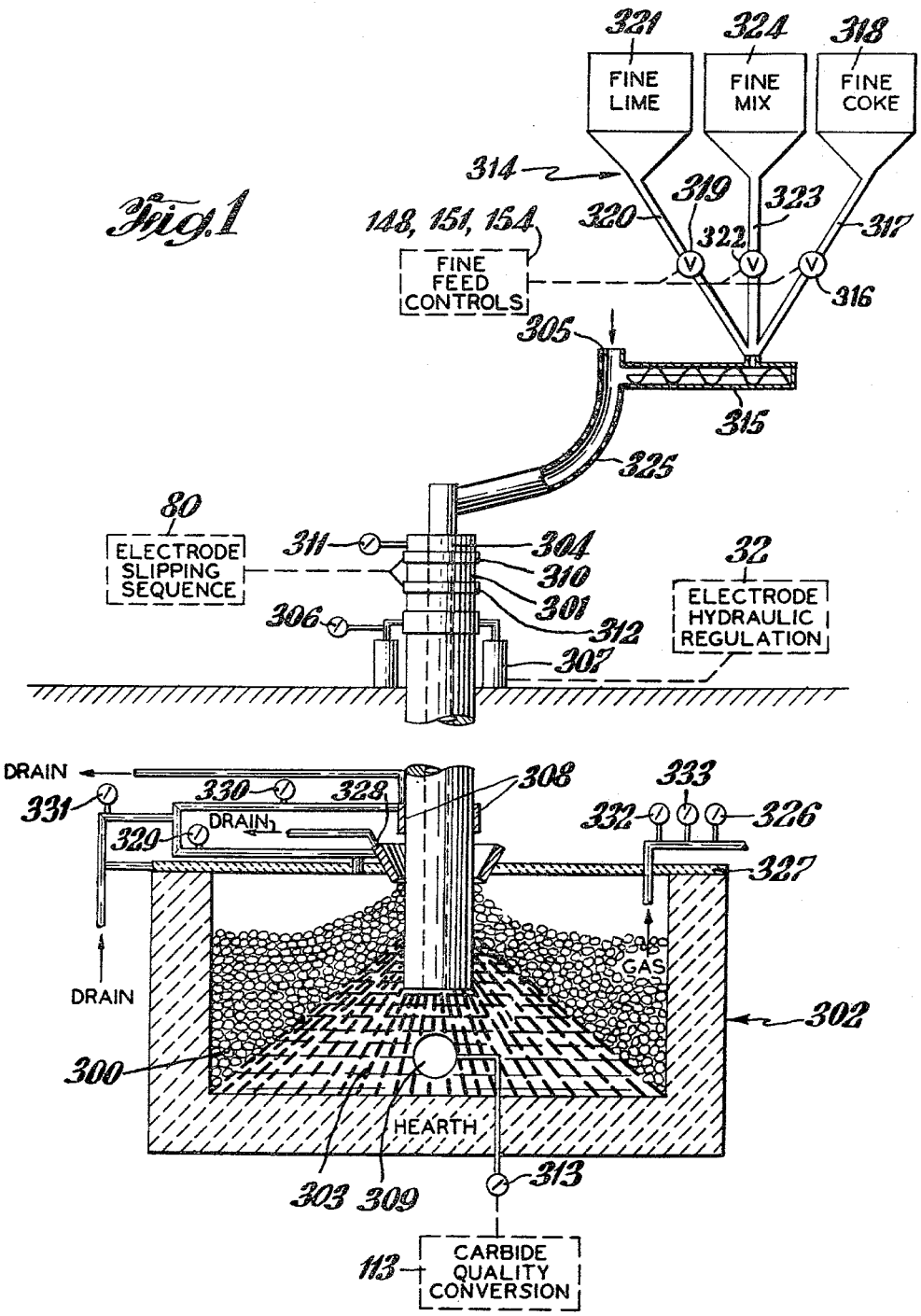
FIG. 1 shows a cross-sectional elevated view of a submerged-arc electric furnace having a hollow electrode and auxiliary instruments suitable for use in practice of this invention.

It is to be understood that the control means associated with the one exemplary hollow electrode shown in the drawings can be duplicated for any number of solid or hollow electrodes in any polyphase electric-arc furnace, such as the conventional three-phase furnace. In addition to compensating for the variables stated above, a number of automatic alarm circuits can be programmed with the system to provide an immediate indication when a malfunctioning in the process and/or the furnace has occurred.

In the preferred embodiment for practicing this invention, as shown in FIG. 1, a coarse lime and carbonaceous reducing agent mixture 300 is placed around hollow electrodes 301 in submerged electric-arc furnace 302. Electrical energy (not shown) is supplied to the electrode to furnish heat whereby the lime-carbonaceous reducing agent is reacted in reaction zone 303 to produce calcium carbide and carbon monoxide. Finely-divided particles of at least one of the reactants is fed into reaction zone 303 through hollow opening 304 in electrode 301 at a rate and blend necessary for maintaining optimum calcium carbide forming proportions. Due to variation in gas pressure at the electrode tip, gas-inlet means 305 supplies a downward flow of gas through hollow opening 304 to balance the gas pressure at the electrode tip and, thus, insure a free fall of the fine feed through hollow electrode 301. Level gage reel 306 is coupled to hydraulic pistons 307 which is adapted to lower and raise hollow electrode 301. The low and high limits of pistons 307 are predetermined and are a function of the length of stroke of the regulating means of the particular furnace being used. The position of regulating pistons 307 within this stroke length, directly determines the position of the bottom of contact plate 308 with reference to an absolute low limit for the tip of the electrode to be off the hearth and this position is referred to as the head position. This head position can be ascertained and thereafter measured using any conventional measuring instrument, such as level gage reel 306, coupled to pistons 307 in such a manner that a preselected reading indication would be correlated to indicate the head position.

Figure 2:
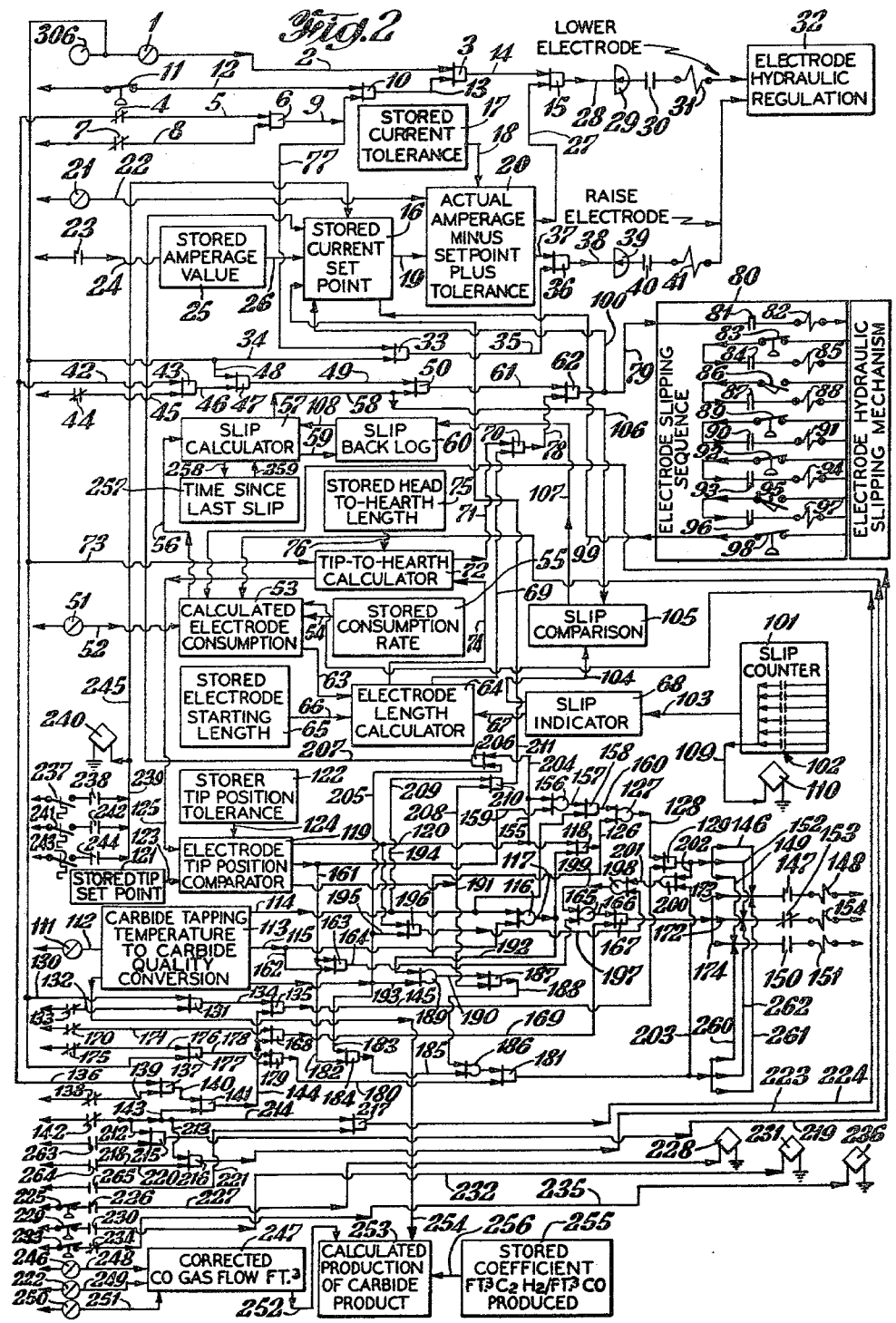
FIG. 2 is a schematic and block diagram of the preferred embodiment of this invention and shows the various elements used to control among other things, the power, feed rate and position of one hollow electrode in a submerged-arc electric furnace.

With reference to the schematic of FIG. 2, when the head position is above a low preset limit mark, a signal from a conventional type transducer 1, is fed via 2 to one input of a two input AND gate 3. A normally closed relay 4 transmits a continuous signal via 5 to the input of a two-input AND gate 6 when the furnace is "on" or in the operational mode. A normally closed computer-manual relay 7 transmits a continuous signal via 8 to the second input of AND gate 6 when the furnace is switched onto computer control. These two signals trigger AND gate 6 into producing an output which is fed via 9 to AND gate 10. A normally closed pressure switch 11, coupled to hydraulic pistons 307, transmits a continuous signal via 12 to the second input of AND gate 10 when the pressure on hydraulic pistons 307 is within a normal preset range. The output from AND gate 10 is then fed via 13 to the second input of AND gate 3 which in addition to the signal from transducer 1 triggers an output signal via 14 to one input of AND gate 15. The second input signal of AND gate 15 is a function of the phase current carried through electrode 301 and is only present when the actual current is below a preset desirable value. This value is a function primarily of the particular furnace being used and is calculated to optimize the production of calcium carbide at a low production cost. The optimum current value to flow through electrode 301 is operator set into control unit 16 along with an allowance current tolerance range which is set into control unit 17. Thus two preset initial current indicative signals are fed via 18 and 19 into a conventional arithmetic unit 20 as is contained in any of the GE/PAC-4000 series computers. The actual current through electrode 301 is detected by any conventional current measuring instrument (not shown) and fed to transducer 21 which in turn feeds a converted signal via 22 to arithmetic unit 20. When and if current is tapped from the bus bar feeding current to electrode 301 for the purpose of opening tap hole 309 of the furnace, then a normally opened relay 23 closes thereby sending a signal via 24 to biasing indicator 25 which is preset to trigger a signal via 26 to control 16 which biases the preset current value set in control 16 to a high level. The exact current value preset in indicator 25 is usually obtained from a knowledge of the furnace and is equal to the current required to melt the solidified material blocking tap hole 309.

In arithmetic unit 20, the corrected set current signal from control 16 is added to the set allowable tolerance signal from control 17 and the sum is subtracted from the actual current signal from transducer 21. If the result is a negative value then a signal is fed via 27 to the second input of AND gate 15. With signals appearing on the two inputs of AND gate 15, an output signal is triggered via 28 to a series connected time delay 29, normally opened relay 30, and solenoid 31 which in turn activates hydraulic regulator unit 32. Pistons 307, forming part of hydraulic regulator unit 32, are then activated to lower electrode 301 a length depending on time delay 29 since as long as time delay 29 keeps relay 30 closed, solenoid 31 will remain energized thereby maintaining pistons 307 in the operative state. Time delay 29 is therefore designed to cause electrode 301 to be lowered in short increment steps, with each step requiring the full procedural process as described above.

Thus with the furnace set on computer control, and the electrode head above a preset calculated lower limit, a negative variation in the optimum current flow through the electrode will automatically cause the electrode to be lowered thereby increasing the amperage through the electrode to the desired optimum range preset in units 16 and 17. The incorporation of biasing unit 25 automatically prevents the erroneous adjustment of the electrode when current is temporarily tapped from the electrode bus for use in melting the solidified material blocking tap hole 309.

Verification that the furnace is "on" and is switched to computer control will trigger AND gate 6 into producing an output signal fed via 77 to one input of a two-input AND gate 33. The second input to AND gate 33 is derived from transducer 1 via 34 when the head position is below the preset high limit mark. These two input signals at AND gate 33 trigger an output signal via 35 to one input of a two-input AND gate 36. The second input to the AND gate is fed from arithmetic unit 20 via 37 when the value obtained therein is a positive quantity. The triggering of AND gate 36 provides an output signal fed via 38 to the series connected time delay 39 and relay 40 which energizes solenoid 41 to activate electrode pistons 307, contained in electrode hydraulic regulation unit 32, into raising electrode 301. Again time delay 39 is incorporated to effectively raise the electrode in increment lengths only and functions the same as time delay 29.

The automatic slipping of the electrode in descrete increments, to compensate for the consumption of the electrode during usage is initiated by a furnace "on" signal from relay 4 being fed via 42 to the first input of two-input AND gate 43. The second input signal to AND gate 43 is derived via 45 from a normally closed relay 44 which in the normally closed state indicates that the slipping means is on computer control. The output of AND gate 43 is fed via 46 to one input of a two-input AND gate 47, with the second input being supplied from transducer 1 via 48 when the head position is below the preset high limit mark. These two input signals trigger AND gate 47 into transmitting an output signal via 49 to one input of a two-input AND gate 50. Simultaneously with this checking procedure, a conventional megawatt-hour meter (not shown) is incorporated into the power circuit supplying the current to electrode 301 and is coupled to a transducer 51 which provides a signal output indicative of the integrated power being fed to electrode 301. This representative signal is fed via 52 into an arithmetic unit 53 which calculates the electrode consumption by comparing this signal to a signal fed via 54 from storage unit 55. This storage unit is initially fed an electrode-consumption rate representing the power necessary to consume one inch of an electrode during the normal operating mode of the furnace. This rate is based on historical experience in the production of calcium carbide and is expressed in megawatt-hour per inch. The exact electrode-consumption rate depends, among other things, on the grade and size of the electrode and the electric-arc furnace employed. For example, an electrode-consumption rate between about 25 mwh/in. and about 32 mwh/in. has been used with success for a 23.5 megawatt furnace employing 45-inch diameter by 110-inch long self-baking hollow carbon electrodes. The electrode comsumption arithmetic unit 53 compares the actual integrated power consumed with the electrode-consumption or usage rate and calculates therefrom the length of electrode consumed during the specific time period. The calculated consumption value, expressed as a signal, is fed via 56 to arithmetic slip calculator unit 57 wherein an output signal, representing whole inch increments, is fed therefrom via 58 to AND gate 60. The portion of the signal that represents only a fraction of an inch is fed via 59 into slip back log storage unit 60 to be retained therein until a whole inch representative signal is accumulated where upon it is fed back via 108 to unit 57.

As a safety factor against the possibility of too rapidoy slipping the electrode and thereby feeding an unbaked portion of the electrode into the furnace, time unit 257 is coupled to slip calculator unit 57 and is triggered by a slipping command output signal from unit 57 via 258. Thereupon time unit 257 transmits an output signal via 259 back to unit 57 so as to bias or prevent unit 57 from transmitting commands for successive slips of two or more inches during consecutive hours. Thus unit 57 will store a second slip-request signal until an appropriate time has elapsed from the transmittal of the first slip-request signal.

With signals transmitted to both inputs of AND gate 50, an output signal is fed via 61 to one input of two input AND gate 62.

The output from electrode consumption unit 53 is fed via 63 to electrode length calculator unit 64. In unit 64 the output signal via 66 from control unit 65, representing the starting length of the electrode which is preset by an operator and obtained by conventional sounding techniques or the like, is combined with the electrode consumption output signal from unit 53 and the output signal from slip indicator 68, representing the actual slippage of the electrode, to produce a signal indicative of electrode length. The calculations performed in arithmetic unit 64 is a combination of addition and subtraction accounting to the equation:

| Initial Electrode Length (Below the contact plates) | Actual + slippage | Electrode − Consumption | Actual = Electrode Length (Disregarding adjustment via unit 32) |
|---|---|---|---|

If the length so calculated is less than a preset maximum electrode length, an output signal generated in unit 64 will be fed via 69 to one input of two-input AND gate 70. The preset maximum length limitation is incorporated into the logic circuitry to insure than when an electrode signal slip command is initiated, the electrode will not penetrate too far into the mix burden and hence too close to the hearth or conversely, the head position be driven too high in order to achieve the desired tip position.

The second input to AND gate 70 is derived via 71 from electrode tip-to-hearth calculator unit 72. In this unit the head position signal from transducer 1 via 73 is combined with the electrode length signal from electrode length calculator unit 64 via 74 and with a two-limit head signal from the electrode head-to-hearth storage unit 75 via 76. Initially a predetermined distance measurement between the head-low limit to hearth as a function of the regulation means is preset into storage unit 75 which allows for a minimum tip-to-hearth dimension for an initial electrode length dimension. The tip-to-hearth unit 72 compares these three input signals and using appropriate arithmetic circuitry calculates the tip-to-hearth position and hence the penetration of the electrode into the mix burden from the equation:

$$\text{Tip-to-hearth Position} = \text{Low-Limit Distance (between head-to hearth-75)} + \text{Head Position ( )} - \text{Electrode Length (64)}$$

If the tip-to-hearth dimension as represented by the calculated signal from unit 72 is above a preset minimum level signal calculated for proper furnace operation to produce a quality carbide product, then an output signal is fed via 71 to the second input of AND gate 70. Thus with the length of the electrode below the contact plates less than a predetermined maximum length and the tip-to-hearth length above a minimum value, AND gate 70 triggers an output which is fed via 78 to the second input of AND gate 62. With the slip command signal on the first input, AND gate 62 is thereby triggered into initiating a slip signal output via 79 which indicates that all the necessary precautions and conditions of the furnace are in operating condition for allowing electrode 301 to slip.

The slip output signal is fed into a series sequential unit 80 composed of switches, relays and solenoids. The slip command signal initiates the slipping sequence by closing a normally open relay 81 thereby energizing solenoid 82 which opens top band 310 on the upper portion of electrode 301. A normally closed pressure switch 83 is opened upon detection of the opening of top band 310 and in turn causes normally opened relay 84 to close thereby energizing solenoid 85 which raises top band 310 by hydraulic means (not shown) a preset distance preferably about 1 inch. Limiting switch 311 could be placed at the upper most vicinity of the electrode and be set to trigger an alarm signal or the like whenever top band 310 is approaching the extreme end of the electrode. Once top band 310 is raised the predetermined amount, a normally opened switch 86 is closed which in turn closes a normally opened relay 87 thereby energizing solenoid 88 which closes top band 310 at its higher located position. The closing of top band 310 deactivates a normally closed pressure switch 89 which then causes normally opened relay 90 to close thereby energizing solenoid 91 into opening bottom band 312. Upon verification of the opening of bottom band 310 by means of normally closed pressure switch 92, the electrode 301, along with the closed top band 310, is lowered by conventional hydraulic means (not shown) which are activated through series connected normally opened relay 93 and solenoid 94. Normally opened limit switch 95 is then closed upon detection of the completion of the lowering of electrode 301 and top band 310 by a distance corresponding to the distance top band 310 was initially raised. Switch 95 triggers a signal to close normally opened relay 96 which in turn energizes solenoid 97 into closing bottom band 312. Verification of the closing of bottom band 312 via normally closed pressure switch 98 produces an output signal which is fed via 99 to storage unit 16. Electrode slipping sequence unit 80 could also be arranged whereby the output of the individual steps in the sequence chain could be fed into a computer which in turn would evaluate the input signal and then transmit an output signal to initiate the next step in the sequence. Thus each step in the sequence would be advanced only if all conditions in the furnace remain in a state requiring the electrode to be slipped to correct for consumption.

At the initiation of the slipping command from the output of AND gate 62, a signal is fed via 100 to storage unit 16 wherein the stored set current for the electrode is reduced a predetermined amount normally about 100 amperes based on an increment slipping of 1 inch. The reduction of the set amperage in storage unit 16, by a fixed amount, is to insure that the electrode hydraulic regulation 32 will be temporarily activated to raise the electrode prior to initiation of the slipping procedure so that the electrode will be in a position to be physically slipped without interference and to prevent an instantaneous current overload when the electrode is slipped. Once the slipping is completed, a verification signal is fed from sequential unit 80 via 99 to storage unit 16 whereupon the reduced amperage signal from AND gate 62 is in effect cancelled and the set amperage point is restored to its initial value.

As the actual slipping occurs, a slip counter means 101, such as a parallel connected relay arrangement 102, feeds a signal representative of the actual slippage of the electrode via 103 to slippage indicator 68. One output therefrom via 67 is fed to electrode length calculator unit 64 as described above and a second output is fed via 104 to comparison unit 105. Here a signal representing the requested slip length fed via 106 from command slip calculator unit 57 is compared with the signal representing the actual slippage and the difference therebetween, if any, if fed via 107 to slip storage unit 60. Here the signal representing this slip difference is added to the signal representing the fractional inch slip requirement from command unit 57 and the sum therefrom is fed via 108 back to command unit 57 which provides an output signal via 58 representing whole inch slip increments as described above. If any fractional inch signal is again present in slip command unit 57, it is fed via 59 back to slip back log unit 60.

If the electrode is slipped in excess of a preset maximum number of inches then an output signal from an appropriate relay in relay arrangement 102 is fed via 109 to trigger alarm 110 whereupon a visual check can be made to ascertain and correct the situation if such be the case. In addition, this signal can also be used to shut off the furnace power to avoid possible serious consequences which could occur if electrode 301 was projected too close to the hearth.

Thus the slipping and regulation of the electrode as a function of power and electrode consumption is fully automatic. The various preset storage units incorporated into the overall means for implementing this automatic process are flexible enough to accommodate a wide range of initial conditions so that calcium carbide can be automatically produced from various size furnaces using solid or hollow electrodes and operating at different power requirements.

When employing hollow electrodes, the feeding of fine coke, fine lime and mixtures thereof is all automatically controlled and regulated by use of conventional type logic circuits to insure that the furnace will be operating at substantially optimum conditions.

With reference to FIGS. 1 and 2, the carbide temperature is checked at the tapping hole 309 at periodic intervals by use of temperature recording means 313, such as two color pyrometers or the like, and then conventional transducer means 111 transforms this temperature reading into an output signal. This signal is fed via 112 to unit 113 wherein a correlation between tap temperature and carbide quality is stored. The carbide quality is related to the cubic feet of acetylene per pound of carbide as determined from an acetylene generator and at about 5.96 cubic feet of acetylene per pound of carbide product, the product approaches pure carbide. A curve of carbide quality vs. tap temperature is non-linear and at temperature in the above 1900° C. range, the curve asymtotically approaches this 5.6 cubic feet per pound limit. The exact curve of carbide quality vs. tap temperature can be approximated to be a single linear curve in the region of interest in the production of calcium carbide and is shown as such in FIG. 3. Thus, the curve can be expressed as a simple equation wherein:

Carbide Quality=(0.00466 Tap Temperature−3.23)±10%

This equation was derived from data on the tap temperature and carbide quality of several samples of molten carbide taken at different temperature intervals from a 23.5 megawatt furnace during a test production run for calcium carbide. This data is shown plotted as circles in FIG. 3 along with a linear curve approximation of the data which is valid for temperatures between 1640° C. and about 1900° C. and between a carbide quality ($ft^3C_2H$/lb.$C_2C_2$) of about 4.3 and about 5.6. In this form the equation can be programmed for any type conventional computer using commercially available arithmetic circuitry as is contained in the GE/PAC 4000 series computers. Thus the sensing of the tap temperature of the product can be converted into a signal by transducer means 111 which can then be fed into conversion unit 113 where it is then automatically converted into a signal representative of carbide quality.

Figure 3:
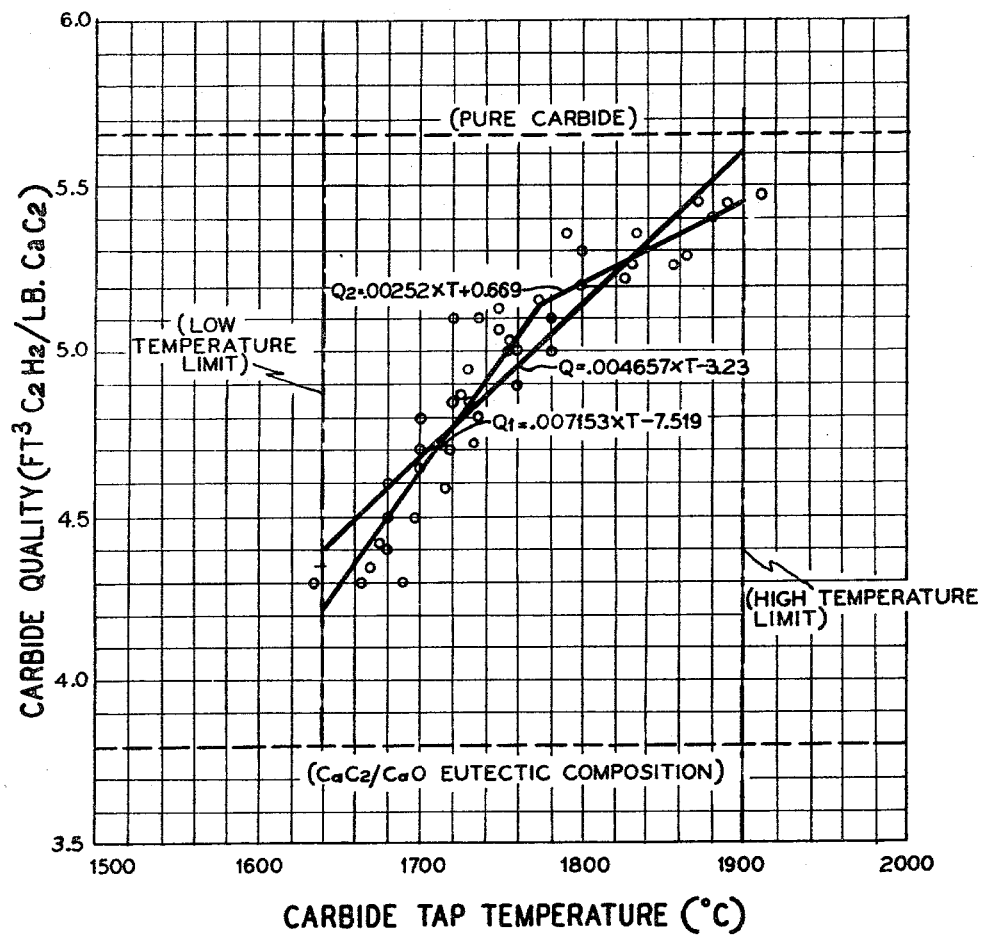
FIG. 3 shows the relationships between the carbide quality and the temperature of a tapped carbide product.

To more exactly regulate the correlation between tap tempertures and carbide quality, the non-linear relationship between the two quantities can be expressed as a combination of two linear curves as shown in FIG. 3. From a tap temperature of between about 1640° C. and about 1760° C. the equation for the carbide quality is expressed as follows:

Carbide Quality=(0.00715 Tap Temperature−7.52)±10%

Between a tap temperature of about 1760° C. and about 1900° C., the carbide quality is expressed as follows:

Carbide Quality=(0.00252 Tap Temperature+0.67)±10%

This two-segmented linear curve more exactly accounts for the asympotic characteristics of the relationship between tap temperature and carbide quality above 1760° C. However, it is also possible to approximate the carbide quality vs. tap temperature curve by two or more linear curves each having different slopes and y intercepts depending on the temperature range in the non-linear curve segment that is being approximated as a linear curve. A preferable range of carbide quality for producing a high quality product is between about 4.7 and about 5.0 cubic feet of acetylene per pound of carbide product. However, a carbide quality within the range of 4.4 and 5.6 cubic feet of acetylene per pound of carbide may be desirable for particular applications.

Conversion unit 113 provides one of three output based on carbide quality. If the carbide quality as shown in FIG. 3 is below the desired range or within this desired range determined be the exact quality of the carbide product required, then on output signal is fed via 114 or 115, respectively, to OR gate 116 which in turn triggers an output signal via 117 to one input of a two-input AND gate 118. For example, an in range value of between about 4.7 and 5.2 cubic feed of acetylene gas per pound of carbide would produce a commercially saleable product having a carbide quality averaging about 4.9. The second input to AND gate 118 is derived from electrode tip position arithmetic unit 119 via 120. A predetermined tip position and tolerance range based on the particular furnace being used, is initially set in storage units 121 and 122, respectively, and output signals thereof are fed via 123 and 124, respectively, to electrode tip position comparator 119. An additional signal representing the actual calculated tip position from tip-to-hearth calculator 72 is fed via 125 to electrode tip position comparator 119 wherein the actual tip position is compared, by conventional circuitry means, with the preset tip position range. If the comparision yields a low actual tip position then an output signal is triggered and fed via 120 to the second input of AND gate 118. With two signals, representing low or in range carbide quality and low tip position, respectively, being transmitted to AND gate 118, an output signal is produced therefrom which is fed via 126 to two-input OR gate 127. The output from OR gate 127 is fed via 128 to one input of two-input AND gate 129. Thus a low or in range carbide quality signal combines with a low tip position signal to supply a signal to one-input of AND gate 129.

The second input to AND gate 129 is obtained from a series of furnace checks to insure that the furnace is in proper condition before a fine carbonaceous reducing agent, such as coke, is fed through hollow electrode 301 since a low or in range carbide quality combined with a low tip position is indicative of a lack of sufficient coke in the furnace. A pre-established high level mark for the head position with reference to the feeding of fine coke is preset since the adding of only fine coke, while maintaining the current constant, will result in the electrode being raised since the resistance of the coke is less than that of the fine lime or mix feed. When the head position is below this high limit mark a signal is fed from transducer 1 via 130 to one input of two-input AND gate 131. The second input of AND gate 131 is obtained via 132 from a normally closed relay 133 indicating that the fine coke level in the storage bin is above a predetermined low level thus insuring that sufficient feed is in the bin.

The output from AND gate 131 is fed via 134 to one input of a two-input AND gate 135. The second input to AND gate 135 is obtained only after a series of procedural checks are performed through logic circuitry to insure that the furnace and associated apparatus are functioning properly and are all on the automatic control mode. A signal representing that the furnace is on the operational mode is fed from a normally closed relay 4 via 136 to one input of two-input AND gate 137. Normally closed relay 138 transmits a signal via 139 to the second input of AND gate 137 indicating that the fine feed apparatus 314 is on automatic control. The output from AND gate 137 is then fed via 140 to one input of two-input AND gate 141 with the second input being supplied from normally closed relay 142 via 143 which signifies that feed screw 315 is operating properly.

The output from AND gate 141 is fed via 144 to the second input of AND gate 135. With the furnace in an operating state to accept fine coke feed and with its mechanical and electrical elements functioning properly, AND gate 135 is triggered and the output therefrom is fed via 145 to the second input of AND gate 129. This signal in conjunction with the signal appearing on the first input of AND gate 129, which indicates a need for fine coke feed as described above, triggers AND gate 129 which then provides an output via 146 to close normally opened relay 147 thereby energizing solenoid 148 to open valve 316 coupled to feed passage 317 connected to fine coke bin 318. Simultaneously the output from AND gate 129 is fed via 149 to maintain normally open relay 150 in the open state thereby retaining solenoid 151 in the de-energized state which in turn maintains valve 319 closed, such valve being coupled to feed passage 320 connected to fine lime feed bin 321. This prevents any fine lime feed from being fed into the furnace. The output of AND gate 129 is also fed via 152 to open normally closed relay 153 which de-energizes solenoid 154 and in turn closes fine feed mix valve 322 coupled to feed passage 323 connected to fine mix feed bin 324. This stops the mix feed from being fed into the furnace. Thus the triggering of AND gate 129 functions to feed only fine coke via screw conveyor 315 and conduit means 325 through hollow opening 304 in electrode 301 to the exclusion of the fine lime and the fine mix feed. This fine coke feeding continues until the electrode tip position changes or the analysis of the carbide quality shows that sufficient coke has been added to improve the quality of the calcium carbide being produced. As a safety feature, the coke may be fed continuously for a preset maximum period within a specified time interval so as to minimize the possibility of feeding excess coke into the furnace which could disrupt the overall process.

When the electrode tip position is within the preset range or below the preset range, arithmetic unit 119 transmits a signal via 159 or 155, respectively, to one of the inputs of two-input OR gate 156, the output from which is fed via 157 to one input of two-input AND gate 158. The second input to AND gate 158 is derived from a low carbide quality signal is detected by convertor unit 113 and fed via 114. AND gate 158 is then used to trigger OR gate 127 via 160 which in turn supplies a signal for one input of AND gate 129, such AND gate controlling the feeding of fine coke as described above.

Thus a combination of low carbide quality and low or in range electrode tip position, or the combination of low electrode tip position and low or in range carbide quality, will cause only fine coke to be fed providing AND gate 105 is triggered which would indicate all the physical requirements for good furnace operation are functioning properly.

When the electrode tip position and carbide quality are detected as being within desired range, each signal from comparator unit 119 and conversion unit 113 is fed via 161 and 162 respectively, to different inputs of two-input AND gate 163. The output from AND gate 163 is then fed via 164 to one input of two-input OR gate 165 which in turn transmits a signal via 166 to one input of a two-input AND gate 167. The second input for this AND gate 167 is supplied from two-input AND gate 168 via 169. The output from AND gate 141, as described above, is fed to one input of AND gate 168 while a normally closed relay 170, used to indicate that the mix feed is above a minimum level in the bin, supplies the second input via 171.

Thus AND gate 167 will be triggered when the furnace and associated apparatus are functioning normally and set on automatic control, and when both the electrode tip position and carbide quality signals are within the desired range. The output from AND gate 167 is fed via 172 to retain relay 153 in its normally closed state while simultaneously it is fed via 173 and 174, to maintain relays 147 and 150, respectively in their normally open state. This arrangement allows only the precalculated mix ratio to be fed through hollow opening 304 of electrode 301 from fine mix bin 324.

Normally closed relay 175 is used to detect the low level of the feed in fine lime bin 321 and when the level is above a preset minimum, a signal is transmitted via 176 to one input of a two-input AND gate 177. The second input receives its signal from transducer 1 when the head position is above a predetermined low lime feed limit mark, such low limit mark being imposed on the automatic process since the adding of only lime would cause the electrode to be lowered because of its higher resistivity than that of coke and thereby possibly cause disruption to the process. The output from AND gate 177 is fed via 178 to one input of AND gate 179 while the second input is obtained from AND gate 141 which detects the operating conditions of the furnace as described above. With the furnace in physical condition to accept fine lime, AND gate 179 is triggered thereby transmitting an output signal via 180 to one input of two-input AND gate 181. The signal for the second input is derived from a combination of electrode tip position and carbide quality. With the electrode tip position within range and the carbide quality high, each signal from arithmetic unit 119 and convertor 113 is fed via 182 and 183, respectively, to different inputs of two-input AND gate 184, the output from which is transmitted via 185 to one input of two-input OR gate 186. The second input to OR gate 186 is obtained from the output of two-input AND gate 187 via 188. AND gate 187 is triggered by an input from two-input OR gate 189 via 190 and an input upon the detection of high electrode tip position as obtained from comparator unit 119 via 191. OR gate 189 is triggered by signals fed from convertor 113 via 192 and/or 193, representing a low or desired range, and/or high carbide quality, respectively.

Thus AND gate 181 will be triggered when the furnace is in a state amenable for accepting fine lime feed as detected from AND gate 179 and when the combination of in range electrode tip position and high carbide quality, or the combination of high electrode tip position and high, in range, or low carbide quality exist. These combinations of conditions cause AND gate 181 to produce an output signal which is fed via 260 to close normally opened relay 150 thereby energizing solenoid 151 to open valve 319 coupled to feed passage 320 connected to fine lime bin 321. Simultaneously, the output from AND gate 181 via 262 de-energizes solenoid 154 while the output via 261 retains solenoid 148 in its normally de-energized state thereby closing valves 316 and 322 controlling the fine coke feed and fine mix feed, respectively. During this period only the fine lime feed is fed through the hollow electrode 301. Again this fine lime feeding continues until either the electrode tip position and/or carbide quality changes from the combination described above or until a predetermined time period has elapsed within a specified time interval so that excess lime will not be fed into the furnace.

The fine feed mix is also fed to the exclusion of the fine lime or coke feed when both a high carbide quality and low electrode tip position exists. Each of the signals indicative of these conditions is detected by comparator unit 119 or conversion unit 113 and is fed via 194 or 195, respectively, to a different input of two-input AND gate 196. The output therefrom is fed via 197 to two-input OR gate 198 which in turn triggers OR gate 165 via 199. This effectively triggers AND gate 167 and as described above opens valve 322 controlling the fine feed mix. OR gate 198 can also be triggered by the output from NOR gate 200 via 201. This NOR gate 200 is triggered only when AND gates 129 and 181 are non-conducting which results in no signals being fed so the inputs of NOR gate 200 from the outputs of AND gates 129 and 181 via 202 and 203, respectively. This represents the condition whereby the fine coke and fine lime feed valves are closed thus indicating neither of these feeds are required and thus the fine mix feed can be fed through hollow electrode 301.

During the interval of time when the electrode tip position is detected as low and the carbide quality as high signals from comparator 119 and converter 113 are fed via 204 and 205, respectively, to the different inputs of two-input AND gate 206 which is preset to transmit an output signal via 207 to storage unit 16. Here the stored current output for electrode 301 as described above, is reduced a predetermined amount until either the carbide quality or the electrode tip position changes to the desired in range level at which time corrective mix additions can be made to alleviate the other out of range condition. Likewise when a high electrode tip position and low carbide quality condition exists, signals are fed from comparator 119 and converter 113 via 208 and 209, respectively, to different inputs of two-input AND gate 210 which in turn triggers an output signal, fed via 211, to storage unit 16 for the purpose of reducing the preset current level by a predetermined amount. The reduction or addition of the preset current level in storage unit 16 is a function among other things, of the resistivity of the lime, coke and mix feeds. For example, for a 23.5 megawatt type furnace and a preset current value of about 1200 amperes, AND gate 206 or 210 will trigger an output signal representing an increase of 25 amperes or decrease of 25 amperes, respectively, with a maximum of 2 consecutive changes totaling 50 amperes in any one direction. The feed proportions for this example consisted of 38 percent by weight coke and 62 percent by weight lime. The lime and coke employed had the following analysis:

| Lime | | Coke | |
| --- | --- | --- | --- |
| Composition | Percent by Weight | Composition | Percent by Weight |
| CaO | 96.52 | Free carbon | 85.98 |
| MgO | 1.66 | Volatile carbon | 1.72 |
| $CO_2$ | 1.05 | Ash | 12.30 |
| $Fe_2O_3$ | 0.49 | | |
| $Al_2O_3$ | 0.28 | | |

This added function to the automatic control of the operation of the furnace allows for correction of the tip position of the electrode when the combination of carbide quality and electrode tip position are in conflict as to the proper corrective fine feed to be added.

To more accurately reflect the actual consumption of the electrode, as calculated in arithmetic unit 53, corrections are made for the consumption rate based on the exact feed being fed into the furnace. Each of the fine feeds have a different fixed carbon composition and consequently cause the electrode to be consumed at a different rate. A signal from normally closed relay 147, representing that feed screw apparatus 315 is in the operational mode, is fed via 212, 213, and 214 to one input of two-input AND gates 215, 216 and 217, respectively. The second input to AND gate 215 is supplied from normally opened relay 263 via 218, which in the closed state indicates that fine coke is being fed through the electrode. This activates AND gate 215 into transmitting an output signal via 219, into electrode consumption calculator unit 53 to reduce the consumption rate by a preset amount. For example, using the coke mix as specified above, a reduction of about 35% of the electrode-consumption rate would be required. Likewise normally opened relays 264 and 265, indicative of the operating condition of the fine mix and fine lime feed, respectively, would upon being closed, transmit signals via 220 and 221 to AND gates 216 and 217, respectively. AND gate 216 triggers an output signal via 223 to unit 53 which reduces the consumption rate of the electrode a predetermined amount of about 30% when only the fine mix, as specified above, is fed to the furnace. AND gate 217 generates an output signal in 224 which is fed into unit 53 to reduce the consumption rate by a predetermined amount of about 20% when only the fine lime, as specified above, is fed into the furnace. Thus the exact reduction in consumption rate corresponding to each feed is a function of the fixed carbon content of the feed.

When employing water cooling means in the furnace, the water circulating around the furnace can be monitored for flow rate by any conventional means to insure proper cooling of the furnace. For example, the flow rate of the water for cooling cover 327, including inner cone 328, can be detected by flow meter 329 which can then be used to trigger a signal through series connected pressure switch 225 and normally open relay 226 to alarm 228 via 227 whenever the flow rate falls below a preset value. In a similar manner the flow rate of the cooling liquid for electrical contact plate 308 can be ascertained through flow meter 330 which in turn can be coupled to series connected pressure switch 229 and normally opened relay 230 to transmit a signal to alarm 231 via 232 whenever the flow rate falls below a preset minimum value necessary for safe operation. In addition, the pressure of the recirculating cooling water can be determined by meter 331 which can be coupled to series connected pressure switch 233 and normally closed relay 234 which can trigger a signal via 235 to activate alarm 236. Thus the automatic and continuous monitoring of the cooling system provides a means of detecting and preventing prolonged and detrimental heat buildup in the furnace components.

The operating temperature of the transformer supplying the electrical energy to the system can be constantly monitored to insure against overheating. Conventional temperature measuring means, in the vicinity of the transformer, can be appropriately coupled to series connected temperature switch 237 and normally opened relay 238 to initiate a signal via 239 to alarm 240 whenever the temperature rises above a maximum preset limit. In a similar manner series connected temperature switch 241 and normally opened relay 242 or temperature switch 243 and normally opened relay 244 can initiate this alarm signal via 239 whenever the primary cable or secondary bus of the transformer, respectively, exceeds a preset temperature limit. As an added safety feature, the alarm signal, in addition to sounding alarm 240, can also be fed via 245 to storage unit 16 to reduce the current output therein. This will result in a rising of the electrode thus reducing the current load through the effected component while the alarm is being sounded so as to limit any further complications which may result from the overheating of that component.

While the furnace is under complete automatic control once the required furnace information is initially preset into the appropriate storage units as described above, the actual production of calcium carbide can be automatically and continuously calculated during the furnace run. This is accomplished by measuring the furnace off gas flow by meter means 332, as shown in FIG. 1, and coupling the output therefrom to transducer 246, as shown in FIG. 2, which in turn will transmit a signal indication of off gas flow to arithmetic unit 247 via 248. The temperature of the off gas is detected by meter 333 which in turn is coupled to transducer 222, the output therefrom being transmitted via 249 to arithmetic unit 247. Analyzer 326 is used to determine the percentage of CO in the off gas and is coupled to transducer 259 which feed as output signal indicating of CO contents into arithmetic unit 247 via 251. In arithmetic unit 247, the off gas flow is converted for temperature and then the CO contents is corrected for gas flow whereupon the output signal, indicative of corrected CO flow is fed via 252 to another arithmetic unit 253. The carbide quality signal as obtained from unit 113, is also fed via 254 into arithmetic unit 253. A signal representing a coefficient ratio of cubic feet of $C_2H_2$ (acetylene) per cubic foot of CO and preset into storage unit 255 is the third signal fed via 256 into arithmetic unit 253. This ratio of cubic feet of $C_2H_2$ per cubic foot of CO is equal to about 0.93 and has been found to be extremely accurate with respect to the production of calcium carbide using reactants of lime and a carbonaceous reducing agent as previously described.

Arithmetic unit 253 calculates the production of calcium carbide by comparing the three input signals representing corrected CO flow, carbide quality (cubic feet of $C_2H_2$/lb. $CaC_2$) and coefficient of cubic feet of $C_2H_2$/cubic feet of CO according to the following mathematical formula:

$$\frac{CO\ flow\ (ft.^3) \times \frac{C_2H_2(ft.^3)}{CO(ft.^3)}}{\frac{C_2H_2(ft.^3)}{CaC_2(lb.)}} = CaC_2(lb.)$$

The output of unit 253 can be fed into any conventional display or logging apparatus to visually show the production of calcium carbide Thus the complete automatic process for producing high quality calcium carbide can be accomplished by conventional logic circuitry available in commercial computers. The flexibility in the presetting of the storage units allows this calcium carbide process to be implemented by using any type furnace and mix composite. The use of a hollow electrode is advantageous since it provides the optimum means for feeding fine coke and lime reactants directly into the reaction zone. The auxiliary alarm features automatically provie visual and/or audio indications of the existence of a malfunction while simultaneously initiating actions to mitigate the consequences therefrom.

When employing solid electrodes, corrective additions as free lime and/or a carbonaceous reducing agent can be fed in response to the control logic of this process through the regular primary mix feeding system of the furnace, but with a much slower corrective response time than when the corrective additions are fed directly into the reaction zone through the hollow electrode. The control logic shown in FIG. 2 can be used when employing solid electrodes by coupling the outputs therefrom to regulating means connected to free lime and carbonaceous reducing agent bins which in turn will regulate the feed of these reactants into the furnace between inner cone 328 and electrode 301 so as to maintain the carbide forming proportions within some desired range for producing a quality carbide product.

It is also possible to use the electrode regulation, the electrode slipping and the reactant control feed sections of this invention independently in addition to combining them to provide various degrees of automatic control for the production of calcium carbide. The electrode regulation and the electrode slipping control section of this invention can also be used in any submerged-arc electric furnace producing any type of metallurgical product wherein these two controls are necessary. For example, the process and apparatus of this invention can be used to produce such metallurgical products as silicon metal, silicon-bearing alloys, ferromanganese, ferrochromium and the like. By slight alteration in the reactant control feed section shown in FIG. 2, it can be utilized in any submerged-arc electric furnace to regulate the proportions of two or more reactants required for producing any metallurgical product as described above. For example, any metallurgical product quality signal which would indicate that one of the reactants necessary to produce the product is being fed in insufficient proportions can be substituted for the carbide quality signal shown in FIG. 2 and then combined with the logic circuitry, as shown, to provide an output signal for use in automatically regulating the feed proportions of the reactants mix. Thus, this invention is directed for use in any submerged-arc electric furnace employing solid or hollow electrodes for producing any quality metallurgical product such as calcium carbide.

The tremendous saving in employing this automatic process for the production of calcium carbide can be realized from the following Example:

EXAMPLE

A three-phase 23.5 megawatt electric arc furnace measuring 25 feet in diameter by 12 feet deep, and employing three hollow self-baking carbon electrodes, was programmed to automatically implement the process described above. The hollow electrodes measured 45-in. O-D by 4-in. I-D by 110-in. long and penetrated into the furnace a distance wherein each electrode was 55 inches off the hearth. The various measuring instruments shown in FIG. 1 were coupled to the furnance and the output thereof were fed into a CE/PAC 4040 computer suitably programmed as described above in conjunction with FIG. 2.

The fine feed reactants used consisted of the following:

| | Lime | | | Coke | |
|---|---|---|---|---|---|
| Composition | Percent by Weight | Size | Composition | Percent by Weight | Size |
| CaO | 96.52 | ⅜ in. & finer (Tyler Mesh) | Free Carbon | 85.98 | ¼ in. & finer (Tyler Mesh) |
| MgO | 1.66 | | Volatile Carbon | 1.72 | |
| CO₂ | 1.05 | | Ash | 12.30 | |
| Fe₂O₃ | 0.49 | | | | |
| Al₂(O)₃ | 0.28 | | | | |

Mixture

60% Coke and 40% Lime

The coarse mix fed around all three electrodes consisted of the same composition as that of the fine mix and measured about 3 in. ×2 in. and finer to about a minimum size of ¼ in. in any one direction.

The feed bins, similar to those shown as 318, 321, 324 in FIG. 1 measured 200 cubic feet.

The initial furnace information required to be preset into the computer's storage units for this size furnace and for the reactant feed as specified above, is as follows with the numerical notations in parentheses corresponding to the numbered units in FIG. 1.

| | |
|---|---|
| Current storage setpoint (16) | 1200 Amperes |
| Tolerance for current setpoint (17) | ±25 Amperes |
| Current biasing during gas quality and tip position conditions (206,210) | ±25 Amperes |
| Current biasing for tapping electrode (25) | ±25 Amperes |
| Head position set point above absolute low limit (1,306) | 15 inches |
| High limit above the head position set point (1,306) | 15 inches |
| Low limit below the head position set point (1,306) | 14 inches |
| Electrode starting length (65) | 110 inches |
| Time interval between slips (257) | 1 hour |
| Consumption rate (55) | 20 mwh/in. |
| Bias consumption rate for mix feed (223) | 30% |
| Bias consumption rate for lime feed (224) | 20% |
| Bias consumption rate for coke feed (215) | 35% |
| Low limit head-to-hearth length (75) | 150 inches |
| Tip-to-hearth dimension (121) | 55 inches |
| Tolerance on tip-to-hearth position (122) | ± 5 inches |
| High limit head mark above set point of head position for coke feed (1,306) | 10 inches |
| Low limit head mark below set point of head position for lime feed (1,306) | 10 inches |
| Low limit for each feed bin (133,170,175) | 8 cubic feet |
| Flow alarm point for cooling water for cover (225) | 25 psi |
| Flow alarm point for cooling water for plate (229) | 25 psi |
| Pressure alarm point for recirculating cooling water (233) | 35 psig |
| Coefficient ft.³ C₂N₂/ft.³ CO (255) | 0.93 |
| Transformer temperature limit (237) | 70° C. |
| Primary cable temperature limit (241) | 80° C. |
| Transformer secondary bus temperature limit (243) | 87° C. |
| Overslip alarm (110) | 6 inches |
| Carbide Quality Conversion | Q = 0.00333T − 9.53 (1640° C. ≦ T <1750° C.) |
| | Q = 0.00267T + 0.37 (1750° C. ≦T ≦1900° C.) |

The automatic calcium carbide process was continued for a period of 3 months and produced an average of 0.725 lbs. of calcium carbide per kilowatt hour of power. During this 3-month period a total of 17,550 net tons was produced. Simultaneously, with the above test production, a similar type furnace was employed to produce calcium carbide by the conventional manual-operated technique. This second production test run continued for 3 months with more numerous and lengthy shut down periods for maintenance, electrode sounding and undercover cleanout, and resulted in an average of 0.694/lbs. of calcium carbide per kilowatt hour of power. The total test production of 14,350 net tons produced during this 3 month period in a similar furnace by the conventional manual technique was 3,000 net tons below the test production of 17,550 net tons for the automatic carbide process of this invention.

In addition, the number and frequency of shut downs for maintenance, electrode sounding and undercover cleanout purposes was noticeably reduced since the furnace was substantially operating under optimum conditions. A comparison of the shut down periods for the two furnaces revealed an increased operating time of 27 hours per month for the furnace operating according to the automatic process of this invention. This increased operating time resulted in the additional production of 607.5 net tons of calcium carbide based on an average net ton production of 7.5 net tons per hour. The difference between this 607.5 net ton production increase and the overall 3,200 net ton production increase specified above was due primarily to an increase in the overall integrated load during the operation of the furnace which resulted from the maintaining of the set points closer to the optimum values than is possible under manual controls.

Comparison between the carbide quality in each furnace showed that the furnace operating according to this invention had an average carbide quality of 0.2 cu. ft. of acetylene ($C_2H_2$) per lb. of carbide higher than that of the conventionally operated furnace. The average lime usage per pound of $CaC_2$ produced was also decreased by about 260 net tons per month over the conventional process due to the improved control over additions and the effectiveness of feed through the hollow electrode.

The complete test comparison between the two processes for producing $CaC_2$ over a 3-month period can be summarized as follows:

| | lb.CaC₂/ kwh | % Shut down times | Av.CaC₂/ day(tons) | Av.Gas Quality C₂H₂ft³/ lb.CaC₂ | Ton of lime per ton of CaC₂ |
|---|---|---|---|---|---|
| Automatic Process | 0.725 | 2.0% | 195 | 4.90 | 0.87 |
| Conventional Process | 0.693 | 5.8% | 160 | 4.70 | 0.91 |

It can be concluded from the above that the automatic process of producing calcium carbide according to this invention increases the net production output while providing a consistently high quality product at a reduced maintenance cost.

What is claimed is:

1. In a process for the feeding of lime and carbon into an electric arc furnace to produce a calcium carbide product, said electric arc furnace having, in combination, (i) at least one vertical hollow electrode penetrating said furnace and embedded in a mixture of carbon and lime in proportions to provide a submerged arc calcium carbide-forming reaction zone extending substantially from about the lower tip of said electrode to the hearth of said furnace wherein molten calcium carbide is produced (ii) electrically actuatable feeding means for selectively feeding finely divided lime, or finely divided carbon, or a mixture of finely divided lime and carbon in calcium carbide-forming proportions through said hollow electrode into said submerged arc calcium carbide-forming reaction zone and (iii) electrically acttuatable electrode positioning means for maintaining the electric current of the submerged arc at a value which provides a temperature in said calcium carbide-forming reaction zone in the range of about 1640° C. to 1900° C. sufficient for producing calcium carbide by raising said hollow electrode whenever said electric arc current increases to a value which provides a temperature above said range and by lowering said electrode whenever said electric arc current decreases to a value which provides a temperature below said range, said process comprising, (a) continuously detecting the vertical position of said electrode with respect to the hearth of said electric furnace and continuously providing an electrical signal in relation thereto indicative of the position of the electrode tip within said electric arc furnace with respect to said hearth of said furnace, (b) providing an electrical signal indicative of an upper limit electrode tip position with respect to said hearth and a lower limit electrode tip position with respect to said hearth, such that said electrode is embedded in said mixture of lime and carbon, when within said limits and the electric arc current thereby established provides a temperature in the range specified in (iii) above, (c) continuously electrically comparing the electrical signal recited in (a) with the electrical signal recited in (b) and when (i) such electrical comparison indicates an electrode tip position higher than that desired, providing an electrical signal in response to such electrical comparison to actuate said feeding means to feed only lime through said hollow electrode into said submerged arc reaction zone to increase the resistance of the mixture of lime and carbon in said electric furnace thereby causing the electric arc current to decrease, such decrease in current causing said electrode positioning means to automatically lower the electrode and thereby re-establish the electrode tip position below said predetermined upper limit position (ii) such electrical comparison indicates an electrode tip position lower than that desired, providing an electrical signal in response to such electrical comparison to actuate said feeding means to feed only carbon through said hollow electrode into said submerged arc reaction zone to decrease the resistance of the mixture of lime and carbon in said electric furnace thereby causing the electric arc current to increase, such increase in current causing said electrode positioning means to automatically raise the electrode and thereby re-establish the electrode tip position above said predetermined lower limit position (iii) such electrical comparison indicates an electrode tip position within said upper and lower limit positions providing an electrical signal in response to such electrical comparison to actuate said feeding means to feed a predetermined mixture of lime and carbon through said hollow electrode into said submerged arc reaction zone; the improvement whereby the quality of the calcium carbide product is continuously monitored and regulated which improvement comprises, (I). continuously measuring the temperature of molten calcium carbide product within said electric furnace and continuously providing an electrical signal in relation thereto, said signal being indicative of the quality of said molten calcium carbide product;

(II). providing an electrical signal indicative of the desired calcium carbide quality in correlation with the electrical signal of (I) when the calcium carbide quality expressed as Q satisfies one of the following equations and indicative of lower or higher than desired calcium carbide quality when the following equations are not satisfied:

$$Q = (0.00715T - 7.52) \pm 10\%$$

for a measured calcium carbide temperature (T) expressed in degrees centigrade indicated by the electrical signal of (I) in the range of about 1640° C. and about 1760° C., and $$Q = (0.00252T - 0.67) \pm 10\%$$

for a measured calcium carbide temperature (T) expressed in degrees centigrade by the electrical signal of (I) in the range of about 1760° C. and 1900° C.;

(III). continuously electrically comparing the electrical signal recited in (I) with the electrical signal recited in (II) and when (i) such comparison indicates that the quality of calcium carbide product in said electric furnace is lower than the desired quality while concurrently the comparison of electrical signals recited in (c) indicates an electrode tip position higher than that desired, providing an electrical signal in response to such electrical comparison to actuate said feeding means to feed only lime through said hollow electrode into said submerged arc reaction zone to increase the resistance of the mixture of lime and carbon in said electric furnace thereby causing the electric arc current to decrease, such decrease in current causing said electrode positioning means to automatically lower the electrode and thereby re-establish the electrode tip position below said upper limit position (ii) such comparison indicates that the quality of calcium carbide product in said electric furnace is lower than the desired quality while concurrently the comparison of electrical signals recited in (c) indicates an electrode tip position equal to or lower than that desired, providing an electrical signal in response to such electrical comparison to actuate said feeding means to feed only carbon through said hollow electrode into said submerged arc reaction zone to decrease the resistance of the mixture of lime and carbon in said electric furnace thereby causing the electric arc current to increase, such increase in current causing said electrode positioning means to automatically raise the electrode and thereby re-establish the current in said range and also to increase the ratio of carbon to lime and thereby increase the reduction of lime to carbide and consequently increasing the quality of the carbide product, (iii) such comparison indicates that the quality of calcium carbide product in said electric furnace is higher than the desired quality while concurrently the comparison of electrical signals recited in (c) indicates an electrode tip position equal to or higher than the desired, providing an electrical signal in response to such electrical comparison to actuate said feeding means to feed only lime through said hollow electrode into said submerged arc reaction zone to increase the resistance of the mixture of lime and carbon in said electric furnace thereby causing the electric arc current to decrease, such decrease in current causing said electrode positioning means to automatically lower the electrode and thereby re-establish the current in said range and also to decrease the ratio of carbon to lime and thereby decrease the reduction of lime to carbide and consequently decreasing the quality of the carbide product, (iv) such comparison indicates that the quality of calcium carbide product in said electric furnace is equal to the desired quality while concurrently the comparison of electrical signals recited in (c) indicates an electrode tip position higher than that desired, providing an electrical signal in response to such electrical comparison to actuate said feeding means to feed only lime through said hollow electrode into said submerged arc reaction zone to increase the resistance of the mixture of lime and carbon in said electric furnace thereby causing the electric arc current to decrease, such decrease in current causing said electrode positioning means to automatically lower the electrode and thereby re-establish the current in said range, (v) such comparison indicates that the quality of calcium carbide product in said electric furnace is equal to the desired quality while concurrently the comparison of electrical signals recited in (c) indicates an electrode tip position lower than that desired, providing an electrical signal in response to such electrical comparison to actuate said feeding means to feed only carbon through said hollow electrode into said submerged arc reaction zone to decrease the resistance of the mixture of lime and carbon in said electric furnace thereby causing the electric arc current to increase, such increase in current causing said electrode positioning means to automatically raise the electrode and thereby re-establish the current in said range.

* * * * *

UNITED STATES PATENT AND TRADEMARK OFFICE
CERTIFICATE OF CORRECTION

PATENT NO. : 4,213,955
DATED : July 22, 1980
INVENTOR(S) : Ralph A. Casciani et al.

It is certified that error appears in the above—identified patent and that said Letters Patent is hereby corrected as shown below:

Column 1, line 30, after "carbonaceous reducing agent" insert -- mixture --.

Column 2, line 33, "pounding" should read -- sounding --.

Column 8, line 5, "gate 60" should read -- gate 50 --.

Column 8, lines 11 and 12, "rapiody" should read -- rapidly --.

Column 9, in the chart, under the heading "Head Position" "( )" should read -- (1) --.

Column 11, line 64, "output" should read -- outputs --.

Column 11, last line "on" should read -- an --.

Column 15, line 14, "so" should read -- to --.

Column 16, line 4, "147" should read -- 142 --.

Column 17, line 25, "259" should read -- 250 --.

Column 18, line 64, "CE/PAC 4040" should read -- GE/PAC 4040 --.

Column 19, in the chart, first column, last line "$Al_2(O)_3$" should read -- $Al_2O_3$ --.

Column 19, line 52, "$C_2N_2$" should read -- $C_2H_2$ --.

UNITED STATES PATENT AND TRADEMARK OFFICE
CERTIFICATE OF CORRECTION

PATENT NO. : 4,213,955
DATED : July 22, 1980
INVENTOR(S) : Ralph A. Casciani et al.

It is certified that error appears in the above—identified patent and that said Letters Patent is hereby corrected as shown below:

Column 19, line 57," "Q=0.0033T" should read -- Q=0.00833T --.

Column 19, line 58, "$\leqq$" before "T" should read -- $\leq$ --.

Column 19, line 61, "$\leqq$", in both instances should read -- $\leq$ --.

Column 20, line 10, "3,000" should read -- 3,200 --.

Column 21, line 8, "acttuatwble" should read -- actuatable --.

Signed and Sealed this

Twenty-first Day of July 1981

[SEAL]

Attest:

GERALD J. MOSSINGHOFF

Attesting Officer     Commissioner of Patents and Trademarks